(12) United States Patent
Tompkin

(10) Patent No.: US 7,920,372 B2
(45) Date of Patent: Apr. 5, 2011

(54) ELECTRONIC HANDHELD DEVICE WITH USER INTERFACE

(75) Inventor: Crispian Tompkin, Los Angeles, CA (US)

(73) Assignee: Nokia Corporation, Espoo (FI)

( * ) Notice: Subject to any disclaimer, the term of this patent is extended or adjusted under 35 U.S.C. 154(b) by 127 days.

(21) Appl. No.: 12/284,579

(22) Filed: Sep. 22, 2008

(65) Prior Publication Data
US 2010/0073852 A1 Mar. 25, 2010

(51) Int. Cl.
*H05K 7/16* (2006.01)

(52) U.S. Cl. ......... 361/679.01; 361/679.56; 361/679.08; 345/168

(58) Field of Classification Search ............. 361/679.01, 361/679.56, 679.08; 345/168
See application file for complete search history.

(56) References Cited

U.S. PATENT DOCUMENTS

| | | | |
|---|---|---|---|
| 6,101,086 A * | 8/2000 | Kim et al. | 361/679.55 |
| 6,813,143 B2 | 11/2004 | Makela | 361/679 |
| 7,010,331 B2 * | 3/2006 | Johnson et al. | 455/575.1 |
| 7,502,220 B2 * | 3/2009 | Shudo et al. | 361/679.3 |
| 7,526,082 B2 * | 4/2009 | Abe et al. | 379/433.11 |
| 7,540,466 B2 * | 6/2009 | Yang | 248/688 |
| 2005/0277453 A1 * | 12/2005 | Kim | 455/575.8 |
| 2009/0318203 A1 * | 12/2009 | Anand et al. | 455/575.3 |
| 2010/0016036 A1 * | 1/2010 | Urushihara et al. | 455/575.1 |

FOREIGN PATENT DOCUMENTS

| | | |
|---|---|---|
| EP | 1 334 604 B1 | 9/2006 |
| GB | 2 347 302 A | 8/2000 |
| JP | 7288860 | 10/1995 |
| JP | 9018373 A | 1/1997 |
| JP | 2008-294829 A | 12/2008 |
| WO | WO 01/77786 | 10/2001 |

OTHER PUBLICATIONS

"Arugs Beansprout VGA Digital Camera-Pink Sprout-Pink", Product Brochure, http://www.tigerdirect.com/applications/searchtools/item-details.asp?..., Sep. 2008, 6 pgs.
"The Mobile Hornet . . . for those who get turned on by mobile devices", http://www.mobilehornet.com/archives/category/android, Sep. 2008, 18 pgs.
"Pirvot display", U.S. Appl. No. 11/754,588, filed May 29, 2007, 33 pgs.

* cited by examiner

*Primary Examiner* — Lisa Lea-Edmonds
*Assistant Examiner* — Ingrid Wright
(74) *Attorney, Agent, or Firm* — Harrington & Smith

(57) ABSTRACT

A handheld electronic device has a body that is substantially less thick than wide and long. The body has a user side with a user interface and which body defines an aperture through the body substantially perpendicular to the user side so as to provide a grip for holding the device. Also a method is disclosed in which a rod is inserted to the aperture so as to support the handheld electronic device in a backward tilted angle.

13 Claims, 5 Drawing Sheets

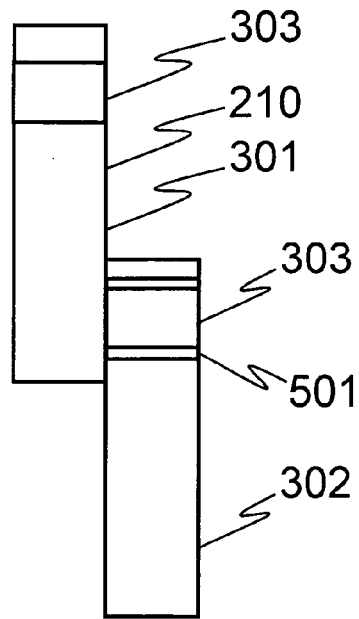
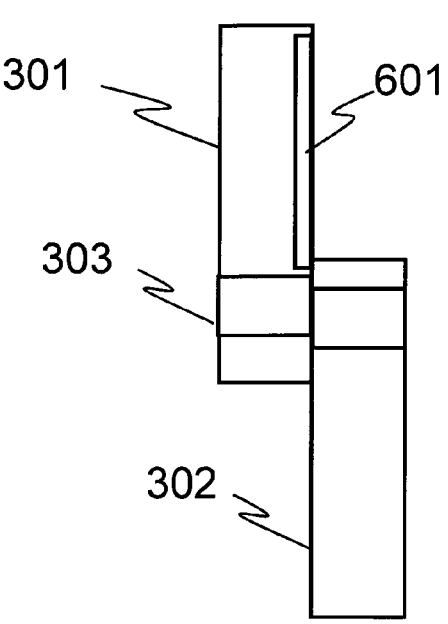
Fig. 5
Fig. 6
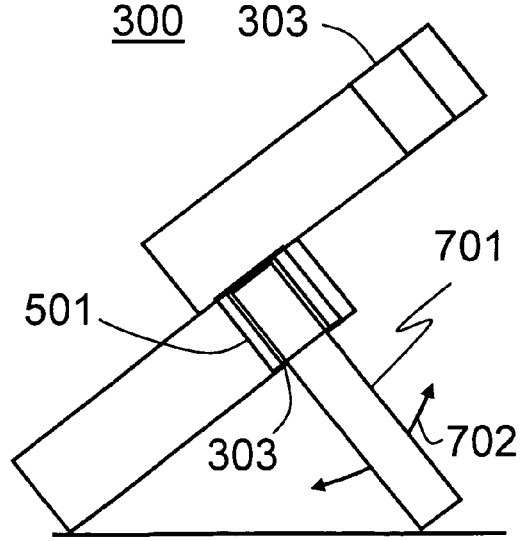
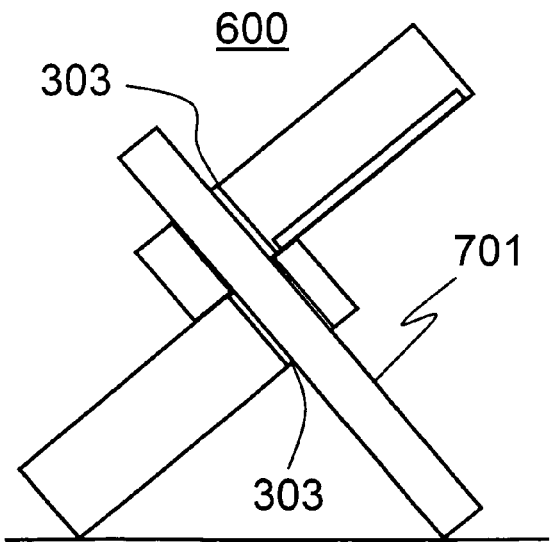
Fig. 7
Fig. 8

ELECTRONIC HANDHELD DEVICE WITH USER INTERFACE

FIELD OF THE INVENTION

The present invention generally relates to an electronic handheld device with a user interface. The invention relates particularly, though not exclusively, to mobile phones with a user interface configured to be movable between an extended and compacted configuration.

BACKGROUND OF THE INVENTION

Battery operated electronic hand-held devices such as mobile phones should generally be convenient to carry along and to use. PDA's and other devices are commonly provided with a user interface that is movable between an opened and closed configuration. For instance, a keypad may be extended by sliding out some or all of the keys or a hinge may be provided in order to enable compacting of the device for easy pocketing and opening up the device so that a display and keypad become conveniently spaced apart. In optimal case, a rectangular handheld device having a given footprint on a desk may have doubly the area of its footprint available for disposing a keypad and a display when the device is extended.

One new trend is that young people are ever more often using their mobile phones as a clock instead of a watch. The reason for this is mostly convenience; it is found vain to wear a watch for occasionally checking the time when in office work the time is often constantly shown by a computer screen and when on the move the time can be found from a mobile phone. Another example of the desire to integrate different functions to a common device is that many advanced mobile phones now provide the functions of a digital camera, camcorder, music player, PDA device and even a Global Positioning System (GPS) navigator. Generally, the trend has been to make ever more use of digital data processing circuitry of a mobile phone to provide new functions ranging from a clock to a GPS device.

Another, already older trend in mobile phones design is to manufacture ever better looking phones which may have metal covers or otherwise glossy surfaces. External antennas have largely given way for internal antennas. The edges of mobile phones are often rounded. Consequentially, on taking a phone from a pocket or from a hand bag, it may be difficult for a user to get a good grip of the phone so as to securely lift the phone without a considerable risk of dropping and damaging the phone.

Further, mobile phones are being used for a multitude of different tasks in addition to placing phone calls and sending short messages. For instance, a user may attend to a video phone call or video conference, watch a video, follow a television broadcast, or read a digital book on a display of the mobile phone. When watching at a display of a phone for an extended period of time, a problem may arise from positioning the phone in a suitable angle. Simply laying the phone on a desk may either result in an oblige viewing angle at which particularly color displays lose some of their image quality, or the user may be forced to watch the display from above in which case the user should remember to frequently pause watching to stretch her back and neck. On the other hand, mobile phones should be truly portable. Hence, dedicated stands or cradles for holding the phone in a conveniently tilted backward angle would sacrifice the aim of portability.

SUMMARY

According to a first exemplary aspect of the invention there is provided a handheld electronic device, comprising a body with a thickness that is substantially less than width and length of the handheld electronic device, wherein the body has a user side and which body defines an aperture through the body substantially perpendicular to the user side so as to provide a grip for holding the device.

The handheld electronic device may be configured to receive a rod in the aperture to support the handheld electronic device in a given backward tilted orientation.

By receiving a rod in the aperture, the handheld electronic device may obtain a support for holding the handheld electronic device in a given tilted angle.

The aperture may be dimensioned for a common pen or pencil.

By dimensioning the aperture for a common pen or pencil the supporting rod may not slip through the aperture when supporting the phone in a backward tilted orientation.

The body may comprise material with a substantial friction in a region that defines the inner surface of the aperture. The substantial friction may refer to a friction coefficient of at least 0.5.

The user side may comprise a user interface for presenting information to a user of the electronic device and/or for receiving input from the user of the electronic device The body may comprise first body part and a second body part attached to each other movably between an extended and compacted configuration and the body parts may be configured to define an aperture through the body when the body parts are moved to a compacted configuration.

The first and second body parts may be configured pivotably movable in relation to each other about a pivot axis. The aperture may locate at the pivot axis.

The aperture may provide a grip suited for grasping the electronic device by a hand. The aperture may be dimensioned such that a finger may fit in the aperture or smaller than a finger such that the aperture provides a recess the edges of which provide a grip for grasping the electronic device.

The body may define the aperture by means of an integrated or discrete sleeve.

The sleeve may be configured to be removable by a user and suited for being opened so as to facilitate removal of any objects which may be accidentally caught in the aperture.

The electronic device may further comprise a mirror. The mirror may be attached under the first body part so that the mirror is visible by a larger area when the electronic device is in the extended configuration and protected against dirt and scratches by the second body part when the electronic device is in the compacted configuration.

The first and second body parts may be pivotable about a pivoting axle that comprises a tubular member interconnecting one body part to another body part and configured to rotate through one body part during pivoting of the remaining one of the first and second body parts.

The pivot axis may reside near upper right hand corner of the first part when the handheld electronic device is used in the extended position.

According to a second exemplary aspect of the invention, there is provided a method comprising:
holding a handheld electronic device that comprises a body with a thickness that is substantially less than width and length of the handheld electronic device, wherein the body has a user side and which body defines an aperture through the body substantially perpendicular to the user side so as to provide a grip for holding the device;
inserting a first end of a rod to the aperture; and
placing the handheld electronic device on a surface to lean against the surface by a second end of the rod so that the handheld electronic device is supported in a tilted angle.

The user interface may reside solely or only partly on the user side. The body may have a display on the user side.

The body may comprise a first body part and a second body part movably attached to each other and the method may further comprise:

moving the first body part and the second body part in relation to one another to extend or compact the handheld electronic device.

The first body part and a second body part may be pivotably movable substantially about the aperture, and the method may further comprise:

supporting the handheld electronic device from the aperture and simultaneously pivoting the body parts to extend or compact the handheld electronic device.

According to a third exemplary aspect of the invention there is provided a handheld electronic device, comprising a body with a thickness that is substantially less than width and length of the handheld electronic device, wherein the body means has a user side and which body has means for defining an aperture through the body substantially perpendicular to the user side so as to provide grip means for holding the device.

Different non-binding exemplary aspects and embodiments of the present invention have been illustrated in the foregoing. Some embodiments may be presented only with reference to certain exemplary aspects of the invention. It should be appreciated that corresponding embodiments may apply to other aspects as well.

BRIEF DESCRIPTION OF THE DRAWINGS

The invention will be described, by way of example only, with reference to the accompanying drawings, in which:

FIG. 5 shows a schematic side section of a sliding handheld electronic device in an extended configuration of an embodiment in which through holes are aligned when the handheld electronic device is in the compacted configuration;

FIG. 6 shows a schematic side section a sliding handheld electronic device in an extended configuration of an embodiment in which through holes are substantially aligned in the extended configuration;

FIG. 7 shows the handheld electronic device of FIG. 5 supported in a conveniently tilted angle by means of a rod tipped into the hole; and FIG. 8 shows the handheld electronic device of FIG. 6 supported in a conveniently tilted angle by means of a rod in the hole.

DETAILED DESCRIPTION

In the following description, like numbers denote like elements.

Figure 1:
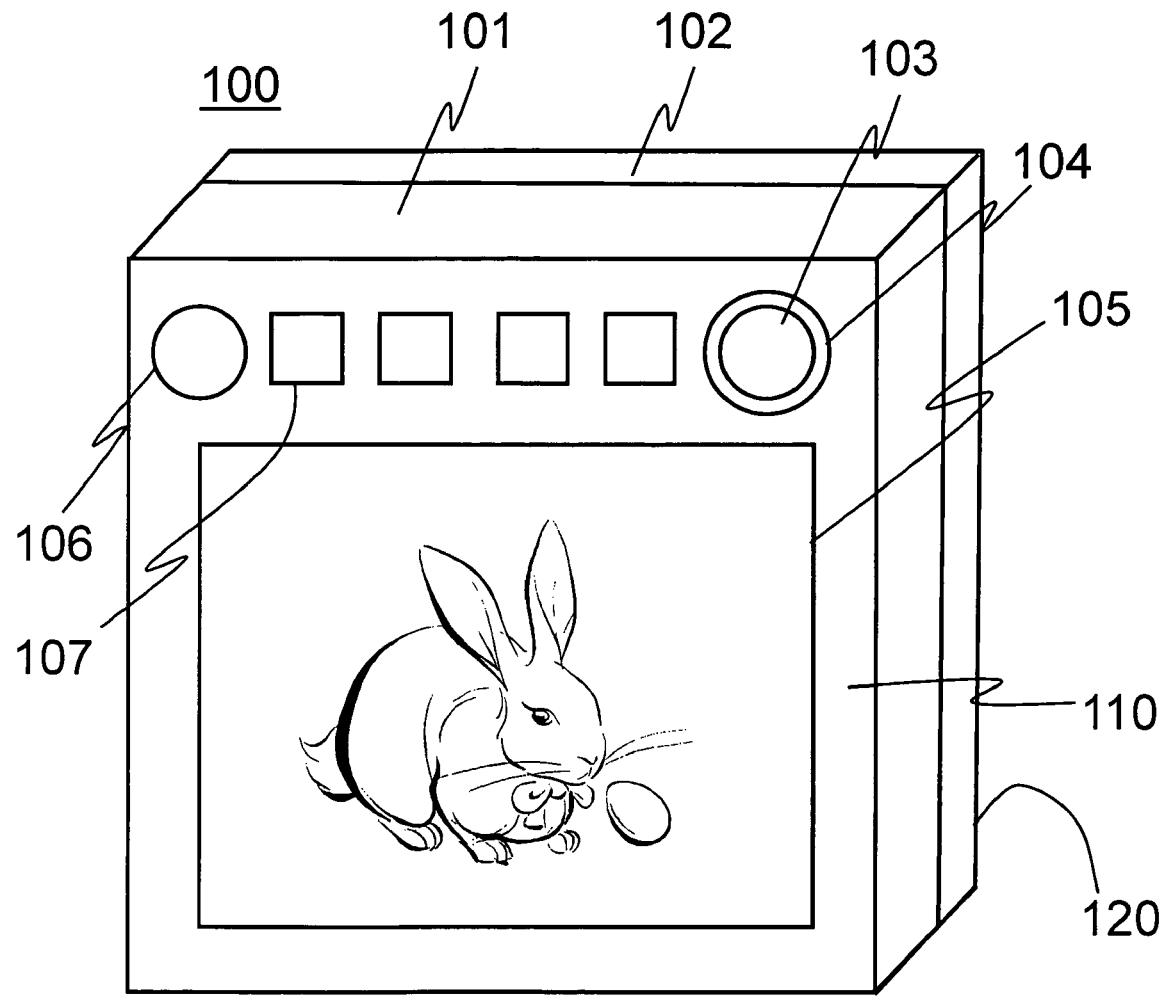
FIG. 1 shows a schematic drawing of a handheld electronic device (in a compacted configuration) according to an embodiment of the invention.

FIG. 1 shows a schematic drawing of a handheld electronic device 100 (in a compacted configuration) according to an embodiment of the invention. The handheld device is a typical battery operated portable device, in this case a mobile phone with a pivoting body. The body comprises two main body parts, that is, a first body part 101 and a second body part 102. A pivoting element 103 connects together the first and second body parts 101 and 102 in a pivotable manner such that the body parts 101, 102 can be moved between the compacted configuration shown in FIG. 1 and an extended configuration shown in FIG. 2. The pivoting element may define a through hole that extends through the handheld electronic device 100. The pivoting element 103 may comprise one or more discreet parts. The pivoting element 103 may further or alternatively be at least partly integrated to either or both body parts 101, 102. The pivoting element 103 may comprise an end region or contact surface 104. The contact surface 104 may have, for instance, a form of a ring surrounding an end of the through hole defined by the pivoting element.

In the compacted configuration shown in FIG. 1 the first body part provides a front surface 110 and the second body part comprises a rear surface 120 for the handheld electronic device 100. The first body part may comprise various user interface elements, on either the front surface 110 and/or on its sides. The user interface elements may comprise any one or more of the following: a display 105; a camera 106 for taking pictures and/or videos and/or for recognizing gestures of a user to input user selections, commands or other input; and one or more keys 107 to input user commands or text entry.

The pivoting element 103 may comprise a sleeve or bushing that defines a hole though the handheld electronic device 100. The hole also functions as a grip for grasping the handheld electronic device. The sleeve may be so arranged that the ends of the sleeve maintain their orientation while the body parts rotate in relation to one another. In result, the sleeve need not slide against grasping fingers on either side (110, 120) of the device 100. Thus the contact between grasping fingers and the ends of the sleeve may be maintained without invoking any rotational sliding between contacting surfaces 105 of the sleeve and fingers. Hence, there is no need to lose the state of rest friction between the finger and the contacting surface 105.

The sleeve may have been formed substantially as a cylinder. Alternatively, the sleeve may define an inner bore that deviates by a given angle from the direction of the pivot axis about which the body parts pivot. The sleeve may further be rotating in relation to the body. Hence, a user may be allowed to turn the sleeve in relation to the body to adjust the angle to which the handheld electronic device 100 sets when placed on a desk with a rod inserted to the hole as shown in FIG. 7 with relation to another embodiment.

The hole may be dimensioned such that a finger may fit in the aperture or smaller than a finger such that the hole or aperture provides a recess the edges of which provide a grip for grasping the electronic device.

Figure 2:
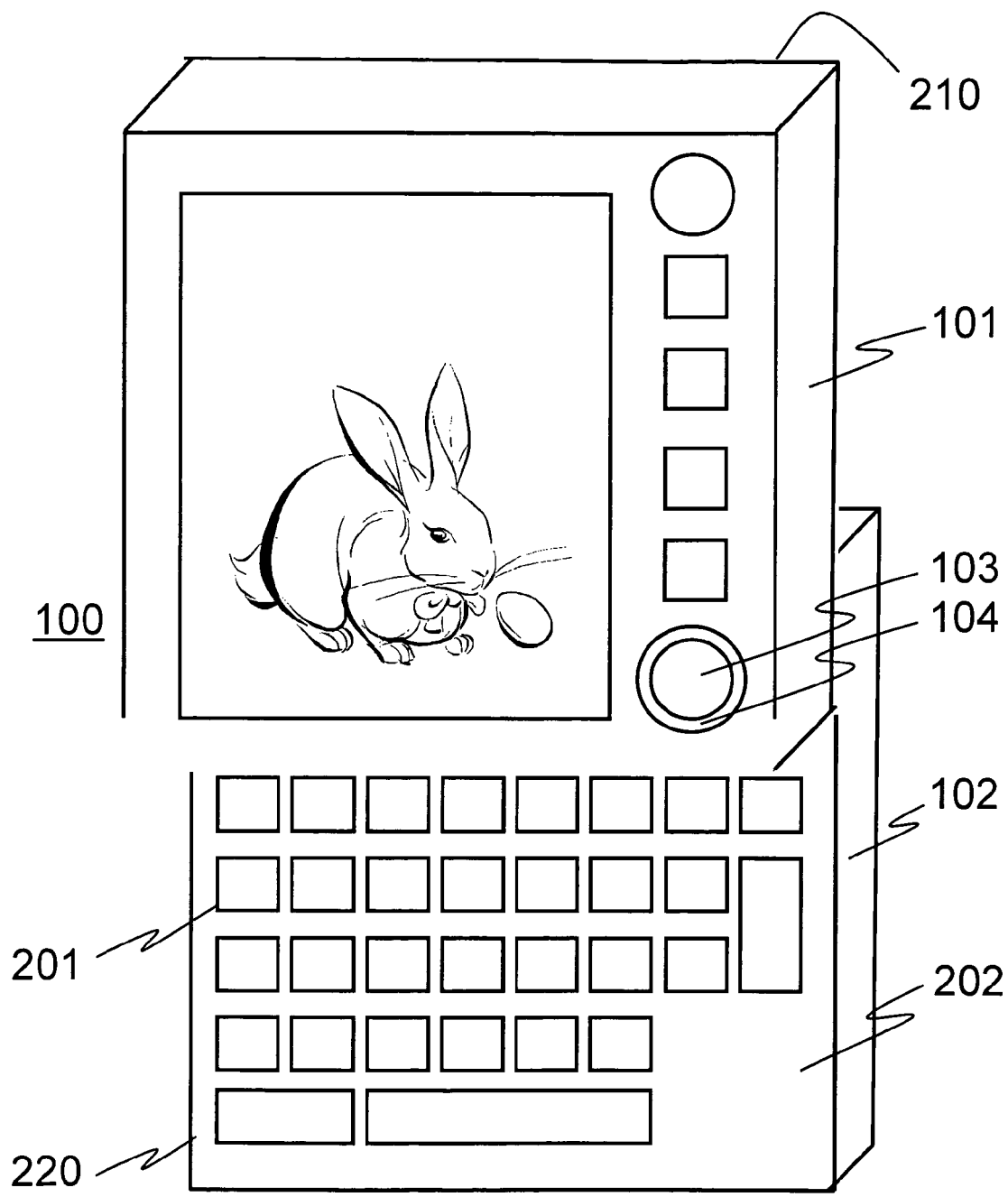
FIG. 2 shows a schematic drawing of a handheld electronic device (in an extended configuration) according to an embodiment of the invention.

FIG. 2 shows a schematic drawing of the handheld electronic device 100 shown in FIG. 1 according to an embodiment of the invention, here in an extended configuration. The first body part has been rotated by 90 degrees clockwise so as to reveal a back surface 210 of the first body part 101 (behind the first body part in FIG. 2) and a front surface 220 of the second part 102. The handheld electronic device 100 may further comprise a secondary user interface, which may comprise one or more keys 201 and/or other user interface elements such as a display (not shown), camera (not shown), speaker (not shown), trackball (not shown), pointing stick (not shown), or touchpad (202). FIG. 2 also demonstrates that rotating the first and second parts in relation to one another reveals the back surface 210 of the first body part 101 and the front surface of the second body part 102. FIG. 2 also demonstrates that the display is configured to automatically rotate the content displayed such that the handheld electronic device 100 may be conveniently used in upright orientation.

Figure 3:
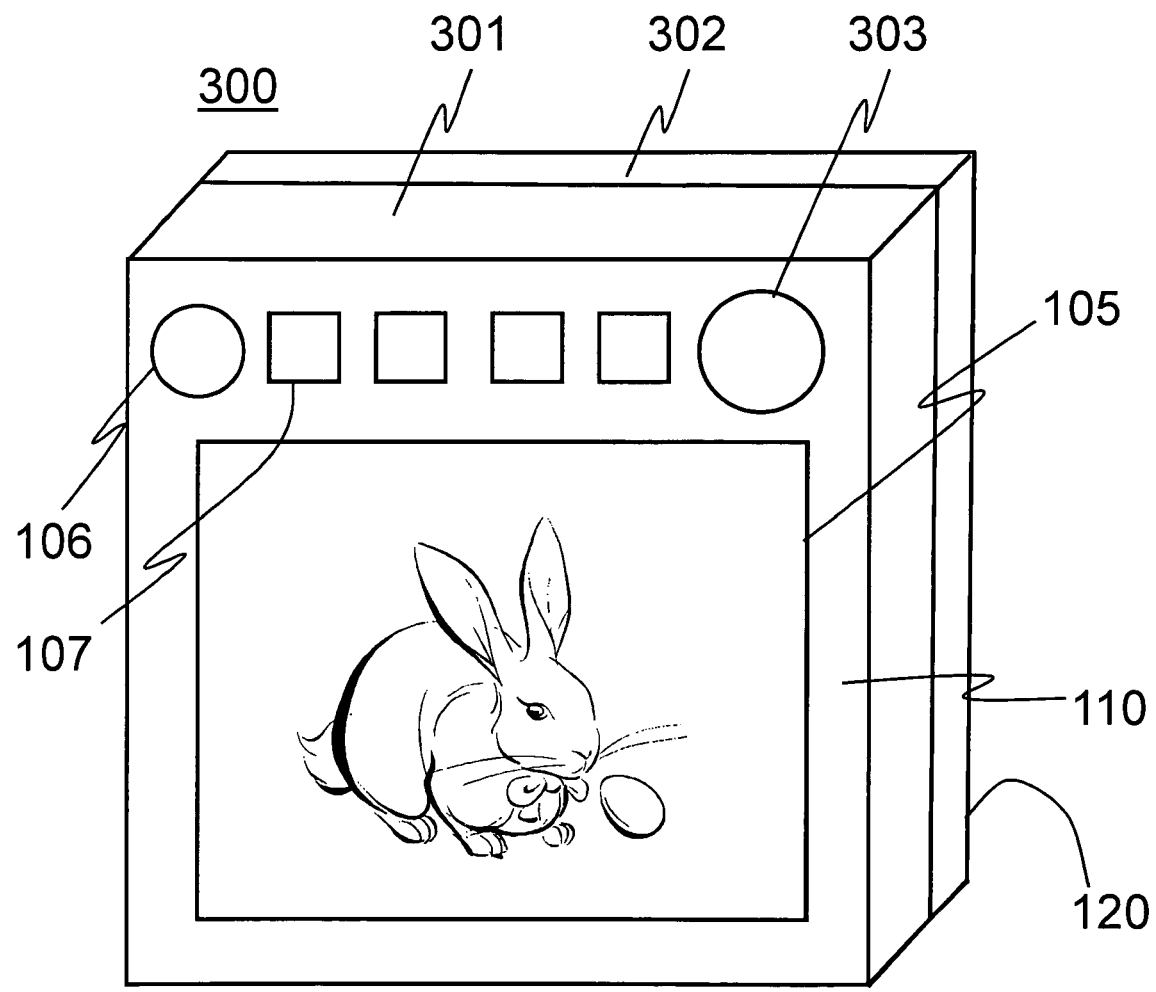
FIG. 3 shows a schematic drawing of a handheld electronic device (in a compacted configuration) according to another embodiment of the invention.

FIG. 3 shows a schematic drawing of a handheld electronic device 200 (in a compacted configuration) according to another embodiment of the invention. The handheld device may be a battery operated portable device such as a mobile phone. In sake of disclosing some further embodiments, the handheld electronic device 200 is next described as a mobile phone. The body comprises two main body parts, that is, a first body part 301 and a second body part 302. The first and second body parts 301 and 302 are slidably attached to each other such that the body parts 301, 302 can be moved between the compacted configuration shown in FIG. 3 and an extended configuration shown in FIG. 4.

Figure 4:
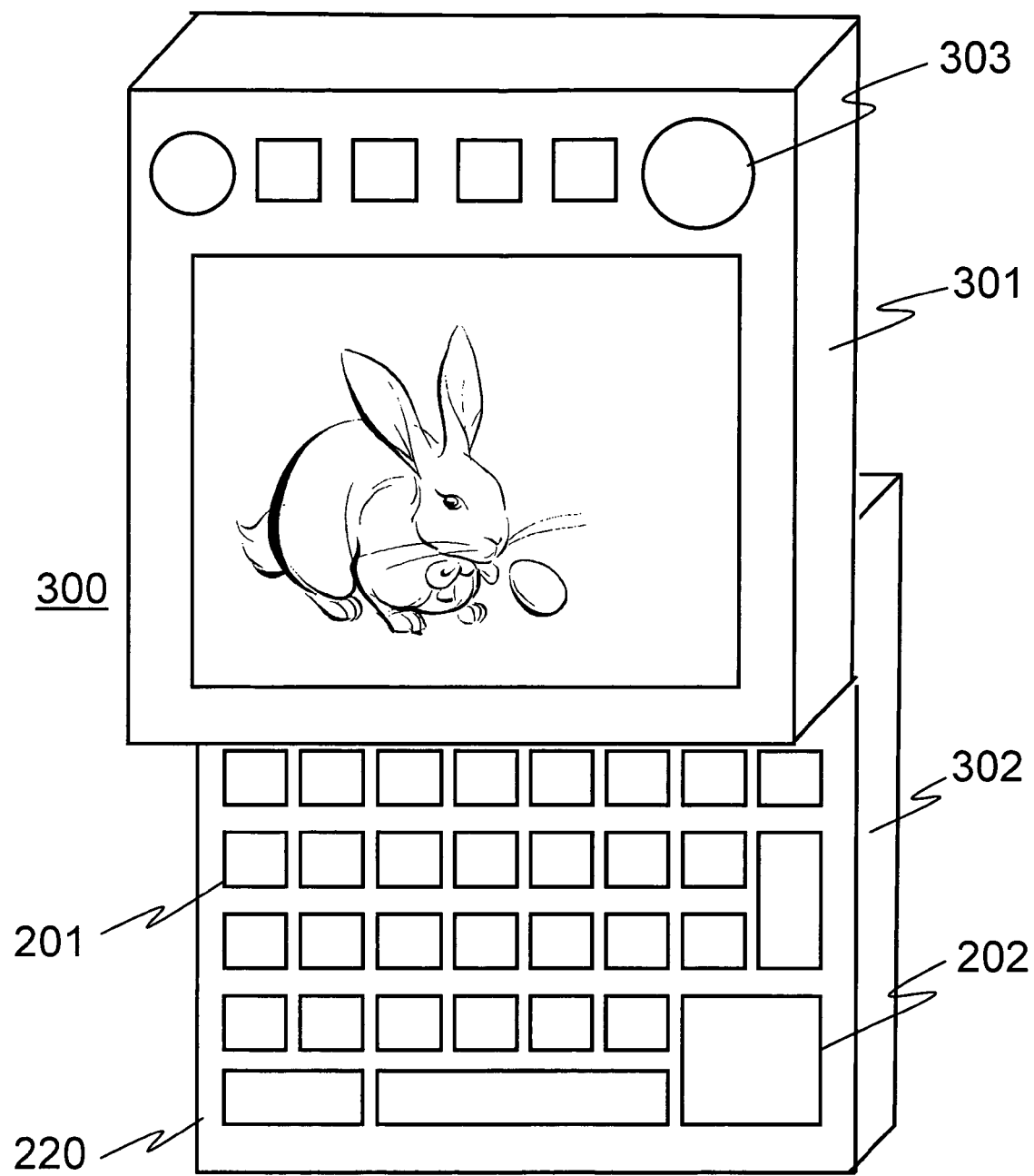
FIG. 4 shows a schematic drawing of the handheld electronic device shown in FIG. 3 in an extended configuration.

FIG. 4 shows a schematic drawing of the handheld electronic device 200 shown in FIG. 3 in an extended configuration. The handheld electronic device 200 of this embodiment resembles that of FIGS. 1 and 2 in that there are a first body part 301 and a second body part 302, but here the body parts are slidably attached to each other. Further, instead of having a pivoting element 103 which provides a hole through the handheld electronic device, the first body part defines a through hole 303. The second body part 302 may also define a through hole 303 (not shown in FIG. 3) aligned with the through hole 303 of the first body part 301 when the handheld electronic device 200 is in a compacted configuration (like that shown in FIG. 1). In this case, the through holes 303 may provide a hole through the entire handheld electronic device 200 when the handheld device is in the compacted configuration. Alternatively, the through holes 303 may be positioned such that they align with one another when the handheld electronic device 200 is in the extended configuration or when the electronic device is in an intermediate position between the extended and compacted configuration.

If the through holes of the first and second body parts 301, 302 are located to engage with each other when the handheld electronic device 200 is in the compacted configuration, the through hole 303 of the second body part 302 is closed by the first body part 301 when the handheld electronic device 200 is extended. Hence, an elongated object such as a pen or pencil may be usefully placed in the through hole 303 such that the back of the first body part 301 abuts the elongated object and the handheld electronic device 200 may be thus supported on a desk to a comfortable viewing angle. On the other hand, the handheld electronic device 200 may then be physically locked to its compacted configuration by fitting a suitably dimensioned object through the through holes 303. The locking object may be an ordinary padlock. Moreover, a hole at the upper part of the handheld electronic device 200 (as shown in FIG. 3) may provide a convenient grip for a finger when holding the handheld electronic device 200 in hand. The through hole 303 of the second body part may also guide a finger of a holding hand to the recess such that antenna placed apart from the hole region may operate efficiently with little obstruction by the hand of the user. Thus, the operating time of a mobile phone built as a handheld electronic device 200 may be extended.

On the other hand, if the through holes 303 are located to engage with each other when the handheld electronic device 200 is not in the compacted configuration, the through hole 303 of the second body part 302 is closed by the first body part 301 when the handheld electronic device 200 is compacted. For instance, the through holes 303 may be positioned in the first and second body parts 301, 302 below the display 105 as seen if FIG. 3.

The handheld electronic device 100, 200 shown in FIG. 1 or 3 may further comprise a biasing element (not shown) configured to induce a force that shifts the holes of the two body parts in relation to one another. By resiliently shifting the holes, it may be possible to suitably restrain a rod placed though the holes in order to avoid the rod sliding through the hole if the rod is used to support the handheld electronic device in a desired angle. In case of a sliding arrangement, on extending the handheld electronic device 100, the through holes 303 inherently move in relation to one another in a linear relation to the mutual movement of the two body parts 301 and 302. In case of a pivoting arrangement, however, the through holes 303 do not move at all in relation to one another if the first holes 103 are circular and co-axial. In order to cause a compressive force to a rod extending through the hole, either the shape or alignment of the through holes may then be varied.

FIGS. 5 and 6 illustrate different alignments of the through holes 103 of a handheld electronic device with a sliding arrangement.

FIG. 5 shows a schematic side section of a sliding handheld electronic device in an extended configuration of an embodiment in which the through holes 303 are aligned when the handheld electronic device is in the compacted configuration. As is seen from FIG. 5, the back surface 210 of the first body part 301 closes the through hole 303 of the second body part. Hence, a user may place one end of a rod (701 in FIG. 7) such as a pen or pencil, for instance, and thus provide the handheld electronic device with a stand for supporting the handheld electronic device in a convenient angle, see also FIG. 7.

FIG. 6 shows a schematic side section a sliding handheld electronic device in an extended configuration of an embodiment in which the through holes 303 are substantially aligned in the extended configuration. As is also seen from FIG. 6, the through holes 303 in the first and second body parts 301, 302 do not quite match but the first body part 301 has extended slightly beyond the stage in which the two through holes 303 have been co-aligned. If a biasing member is provided in the handheld electronic device such that a force applies to the two body parts attempting to misalign the through holes 303, a rod 701 inserted through the through holes 303 is compressed by the opposite sides of the surfaces of the body parts which define the through holes 303. Hence, the rod 701 may be restrained by sufficient friction to maintain the handheld electronic device at a desired angle.

The biasing element may comprise at least one of the following options: a torsion spring, helical spring, pneumatic spring, magnetic spring or elastic spring such as a piece of compressive or stretching material. The spring element may be equivalent to any known spring element.

FIG. 6 further illustrates that the back surface 210 of the first body part 301 may provide a mirror 601. Such a positioning for a mirror is advantageous as the mirror 601 is then covered by the second body part 302 when the device is in the compacted state. When the handheld electronic device 600 is extended, the device 600 may simply be turned around for using the mirror. The mirror 600 may further provide a decorative element for the handheld electronic device 600 by showing reflections to people around a person using the handheld electronic device 600. A mirror 601 may equally well be provided in any other embodiments of the invention, preferably though not exclusively in such handheld electronic devices which have compacted and extended configurations.

FIG. 7 shows the sleeve or bushing 501 that was also mentioned in connection with FIG. 1. The sleeve 501 may be rotatable and have an inner bore angled to the pivoting axis such that by turning the sleeve e.g. by rotating a rod stuck into the sleeve, a variable angle 702 may be achieved for the rod 701. In order to facilitate the grip between the rod 701 and the sleeve 501, either or both of the rod 701 and sleeve 501 may have a form which produces a friction or interlocking for turning the sleeve via the rod 701. Alternatively, the sleeve may be directly rotatable by the user.

In one embodiment of the invention, the through holes 303 are substantially aligned. The through holes 303 may yet provide an enhanced grip and may also enable supporting the handheld electronic device in a tilted angle. For instance, the inner surfaces of the through holes 303 may comprise rubber, soft leather or any other material with a conveniently high friction. For instance, the friction coefficient between the inner surface and a finger may be at least 0.3 or at least 0.5 in one embodiment. Referring to FIG. 8, it is seen that the weight of the handheld electronic device inherently applies a bending force to the rod 701 and thereby induces friction that restrains sliding of the rod 701 in the through hole 303. In yet another embodiment, the dimensions of the second through holes are such that a pen or pencil cannot fully pass through the hole. In this embodiment, the construction of the handheld electronic device may be very simple. Moreover, by dimensioning the hole for a common pen or pencil the hole may be too small for a finger to become stuck in the hole.

By providing a handheld electronic device with a through hole such as one drawn in FIGS. 1 to 8, various synergic advantages may be attained. The outer surfaces 110 and 120 of the handheld electronic device may comprise materials which are easy to clean, dirt resistant and abrasion resistant as the through hole enables a good grip. Also a decorative effect may be achieved. Further still, the hole may enable supporting the device in a tilted angle for convenience of prolonged use. The hole may also enable attaching of a strap for instance in an embodiment in which the handheld electronic device is a mono block unit or the hole is provided substantially at the pivoting axis of a pivoting handheld electronic device as shown in FIGS. 1 and 2. In other embodiments, in which the handheld electronic device comprises body parts which move in relation to one another and a hole through the whole handheld electronic device extends through different moving parts substantially elsewhere than at a pivot axis, the handheld electronic device may further be mechanically locked in an open or closed configuration by placing a constraint through the hole. See e.g. FIG. 5. Further still, the through hole may facilitate one-hand operation. For instance, in case of two mutually movable body parts as shown in FIGS. 1 to 6, a through hole 303 of one body part (e.g. second body part 102, 302) may be used as an anchor point for one finger while using another finger to push the another body part to the extended or compacted configuration. Still further, the through hole may enable hanging the handheld electronic device in a hook for temporarily storing the device. Yet further, thanks to the aperture defined by the body, it may also be possible to avoid integrating any adjustable stands to portable handheld electronic devices while still enabling a user to support the handheld electronic device in a conveniently backward tilted orientation. Hence, it may be possible to also avoid a need to introduce any further moving parts to the handheld electronic device during manufacturing process of the same.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

I claim:

1. An apparatus comprising a body with a thickness that is substantially less than width and length of the apparatus, wherein the body has a user side with a user interface and which body defines an aperture through the body substantially perpendicular to the user side so as to provide a grip for holding the apparatus; wherein
   the body comprises a first body part and a second body part attached to each other movably between an extended and compacted configuration;
   the first and second body parts are configured pivotably movable in relation to each other about a pivot axis; and
   the pivot axis passes through the aperture, wherein the apparatus is comprised of a handheld electronic device.

2. The apparatus according to claim 1, further configured to receive a rod in the aperture to support the handheld electronic device in a given backward tilted orientation.

3. The apparatus according to claim 1, wherein the aperture is dimensioned for a common pen or pencil.

4. The apparatus according to claim 1, wherein the body comprises material with a substantial friction in a region that defines an inner surface of the aperture.

5. The apparatus according to claim 1, wherein the first and second body parts are pivotable about a pivoting axle that comprises a tubular member interconnecting one body part to another body part and configured to rotate through one body part during pivoting of the remaining one of the first and second body parts.

6. The apparatus according to claim 1, wherein the aperture is dimensioned such that a finger fits in the aperture.

7. The apparatus according to claim 1, wherein the aperture is dimensioned smaller than a finger such that the aperture provides a recess, edges of which provide a grip for grasping the electronic device.

8. The apparatus according to claim 1, wherein the body defines the aperture using a sleeve.

9. The apparatus according to claim 8, wherein the sleeve is configured to be removable by a user and suited for being opened so as to facilitate removal of any objects if accidentally caught in the aperture.

10. The apparatus according to claim 1, wherein the handheld electronic device further comprises a mirror.

11. The apparatus according to claim 8, wherein the mirror is attached under the first body part so that the mirror is visible by a larger area when the electronic device is in the extended configuration and protected against dirt and scratches by the second body part when the electronic device is in the compacted configuration.

12. The apparatus according to claim 1, wherein the pivot axis is perpendicular to the user side.

13. An apparatus comprising a body with a thickness that is substantially less than width and length of the apparatus, wherein the body has a user side and which body has means for defining an aperture through the body substantially perpendicular to the user side so as to provide grip means for holding the apparatus; wherein the body comprises a first body part means and a second body part means and means for attaching the first body part means and the second body part means to each other movably between an extended and compacted configuration;

the first and second body part means are configured pivotably movable in relation to each other about a pivot axis; and the pivot axis passes through the aperture, wherein the apparatus is comprised of a handheld electronic device.

* * * * *